(12) United States Patent
Jang et al.

(10) Patent No.: US 12,085,200 B2
(45) Date of Patent: Sep. 10, 2024

(54) CLAMP

(71) Applicants: Hyundai Motor Company, Seoul (KR); Kia Corporation, Seoul (KR); DONG-A METAL CO., LTD., Gyeongsangbuk-do (KR)

(72) Inventors: Yong Seok Jang, Chungcheongnam-do (KR); Yong Gyo Seo, Suwon-si (KR); Han Il Jung, Daegu (KR)

(73) Assignees: HYUNDAI MOTOR COMPANY, Seoul (KR); KIA CORPORATION, Seoul (KR); DONG—A METAL CO., LTD., Gyeongsangbuk-do (KR)

( * ) Notice: Subject to any disclaimer, the term of this patent is extended or adjusted under 35 U.S.C. 154(b) by 36 days.

(21) Appl. No.: 17/971,904

(22) Filed: Oct. 24, 2022

(65) Prior Publication Data

US 2023/0392724 A1    Dec. 7, 2023

(30) Foreign Application Priority Data

Jun. 7, 2022  (KR) ........................ 10-2022-0069077

(51) Int. Cl.
*F16L 33/04*  (2006.01)
*F16L 21/06*  (2006.01)

(52) U.S. Cl.
CPC .................. *F16L 21/065* (2013.01)

(58) Field of Classification Search
CPC ......... F16L 21/065; F16L 3/137; F16L 33/04; F16L 33/06; F16L 33/08; F16L 33/085; F16L 33/10; F16L 33/24
See application file for complete search history.

(56) References Cited

U.S. PATENT DOCUMENTS 2,945,277 A * 7/1960 Wiora ..................... F16L 33/04
                                                        D8/396
2020/0347972 A1* 11/2020 Seimears ................ F16L 33/04

FOREIGN PATENT DOCUMENTS

KR    10-2012-0086161 A    8/2012

* cited by examiner

*Primary Examiner* — Aaron M Dunwoody
(74) *Attorney, Agent, or Firm* — Morgan, Lewis & Bockius LLP (57) ABSTRACT

A clamp has a structure including a band portion wrapping a circular member, such as a hose, a washer portion, a nut portion, and a connection portion and support portions that prevent the band portion from being deformed when a bolt is tightened, these portions being integrally formed with each other into a single portion. Therefore, reduction in the separate portions causes cost reduction, weight reduction, and reduction in risk of loss of the separate portions, and the performance problem in that the clamp rotates when the tightening work is performed by rotation of the bolt is improved.

10 Claims, 6 Drawing Sheets

CLAMP

CROSS REFERENCE TO RELATED APPLICATION

The present application claims priority to Korean Patent Application No. 10-2022-0069077, filed Jun. 7, 2022, the entire contents of which is incorporated herein for all purposes by this reference.

BACKGROUND OF THE PRESENT DISCLOSURE

Field of the Present Disclosure

The present disclosure relates to a clamp configured to fix various hoses and pipes used in a vehicle.

Description of Related Art

In general, a hose is used to allow air flowing in an intake system of a vehicle, and a plurality of clamps is used to fix the hose used in the intake system.

The clamp should be easy to fix the hose, and secures a fastening force to maintain airtightness of the hose so that clean air that has passed through an air cleaner may be sufficiently delivered to the engine.

A conventional clamp is formed so that a circular band, a washer, a nut, etc. are separately provided and assembled to each other. There are problems of expensive costs due to a large number of parts, a risk of loss of separate parts. Specifically, in the work of tightening the clamp by rotating and a bolt with a tool, there is a problem in that the band part is easily deformed to deteriorate the fastening force, and a problem in that reuse is not possible due to deformation of the band part.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a clamp, the clamp including a band portion wrapping a circular member such as a hose, a washer portion, a nut portion, and a connection portion preventing the band portion from being deformed when a bolt is tightened, these portions being integrated with each other into a single portion, so that reduction of the number of the separate portions causes cost reduction, weight reduction, and reduction in a risk of loss of the separate portions, and the deformation of the band portion when the tightening work is performed by rotating the bolt with a tool is suppressed, allowing the enhancement in the fastening force thereof and reuse thereof.

In various aspects of the present disclosure, there is provided a clamp including: a band portion configured to wrap a circular member of a vehicle; a nut portion and a washer portion integrally formed on opposite ends of the band portion, respectively, and bent outward and facing each other; and a bolt passing through both the nut portion and the washer portion and configured to reduce or increase a diameter of the band portion while rotating.

A perforated portion may be formed to extend in a longitudinal direction of the band portion from a first end portion to a second end portion of the band portion and to penetrate through the band portion.

The clamp may include a connection portion located at a location of the band portion opposite to the bolt and connecting a first edge portion to a second edge portion of the band portion across the perforated portion, wherein when the bolt is rotated in a predetermined direction, the connection portion increases holding power of the band portion wrapping the circular member to prevent the band portion from slipping on the circular member.

The clamp may include a plurality of support portions located between the bolt and the connection portion and connecting the first edge portion to the second edge portion of the band portion across the perforated portion, and the plurality of support portions preventing the band portion from being deformed due to a torque when the bolt is tightened.

The washer portion may pass through the perforated portion in a direction from an inside space of the band portion to an outside space of the band portion to face the nut portion.

A reinforcing portion may be formed to protrude from one surface of the nut portion in a direction toward the washer portion; and a screw hole, which may be fastened with the bolt, may be formed to penetrate through the nut portion and the reinforcing portion.

An end portion of the bolt may include an extended portion with a diameter smaller than a diameter of a thread of the bolt; the washer portion may have a washer hole through which the extended portion passes; and an end of the extended portion may have a head portion with a diameter greater than a diameter of the washer hole to prevent the bolt from being removed from the washer hole.

The washer hole may be formed in an oval extended in a longitudinal direction of the washer portion; and when the bolt is tightened and the nut portion and the washer portion move away from each other so that a distance therebetween increases, the extended portion of the bolt may move along the oval washer hole, and thus an internal portion of the band portion may be in circumferentially contact with an external portion of the circular member in a shape of a circle, fastening the band portion and the circular member with each other.

When the bolt is mounted to pass through the screw hole and the washer hole, a first distance between a center portion of the bolt and a first edge portion of the band portion and a second distance between the center portion of the bolt and a second edge portion of the band portion may be different from each other.

The first distance may be a distance from the center portion of the bolt in a rotation direction when the bolt is tightened, and the second distance may be a distance from the center portion of the bolt in a rotation direction when the bolt is released; and the first distance may be formed greater than the second distance so that it may be prevented that an end of the band portion is bent by a torque when the bolt is tightened.

According to an exemplary embodiment of the present disclosure, the clamp includes the band portion wrapping the circular member such as a hose, the washer portion, the nut portion, and the connection portion and the support portions that prevent the band portion from being deformed when a bolt is tightened, etc., which are integrally formed with each other into a single portion. The reduction in the number of the separate portions can cause cost reduction, weight reduction, and reduction in a risk of loss of the separate portions, and the deformation of the band portion when a tightening work is performed by rotating the bolt with a tool may be suppressed, allowing the enhancement in the fastening force and reuse of the clamp.

Furthermore, the clamp according to an exemplary embodiment of the present disclosure includes the band portion and the connection portion that are integrally formed with each other, so that the performance problem in that the clamp rotates when the tightening work is performed by rotation of the bolt may be improved.

Furthermore, the clamp according to an exemplary embodiment of the present disclosure has an improved external appearance in comparison to a wire clamp, so that the external appearance of the engine compartment may be enhanced and the consumer satisfaction may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the present specification. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" may be interpreted in the same manner as those described above.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Hereinbelow, a clamp according to various exemplary embodiments of the present disclosure will be described with reference to accompanying drawings.

As shown in FIGS. 1 to 6, according to an exemplary embodiment of the present disclosure, the clamp 1 is fastened to a circular member 3 of a vehicle and is configured to fix the location of the circular member 3 and to maintain airtightness of the circular member 3.

Figure 1:
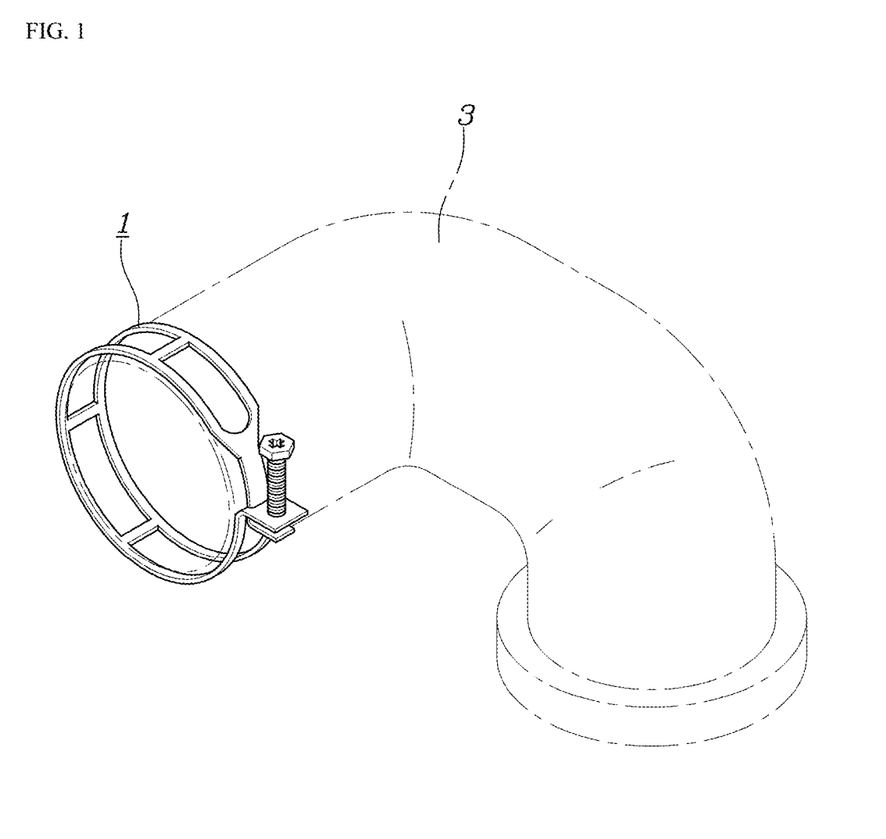
FIG. 1 is a view showing a clamp according to an exemplary embodiment of the present disclosure fastened to a circular member of a vehicle.

A vehicle's intake system utilizes a hose for air flowing. A plurality of clamps 1 is used to fix the hose used in the intake system, and the circular member 3 may be the hose used in the intake system.

Alternately, hoses and pipes through which fluids pass in the vehicle engine's cooling system or oil system may correspond to the circular member 3 of the vehicle.

According to an exemplary embodiment of the present disclosure, as shown in the drawings, the clamp 1 includes: a circular band portion 100 wrapping the circular member 3 of the vehicle; a nut portion 200 and a washer portion 300 integrally formed at opposite end portions of the band portion 100, respectively, and bent outward and facing each other; and a bolt 400 passing through both the nut portion 200 and the washer portion 300 and reducing or increasing a diameter of the band portion 100 while rotating.

The band portion 100 tightens an external surface of the circular member 3 such as the hose of the vehicle while circumferentially wrapping the external surface to serve to fix the circular member 3, and is configured to maintain airtightness of the circular member 3 by a fastening force of the band portion 100. Therefore, air or oil flowing through the circular member 3 is prevented from leaking.

A conventional clamp includes a band portion and a nut portion and a washer portion to which a bolt is fastened, the three portions are separately provided and assembled to each other. In the instant case, many separate portions are provided in the clamp, so that the manufacturing cost is high, and there is a risk of loss of the separate portions.

Figure 2:
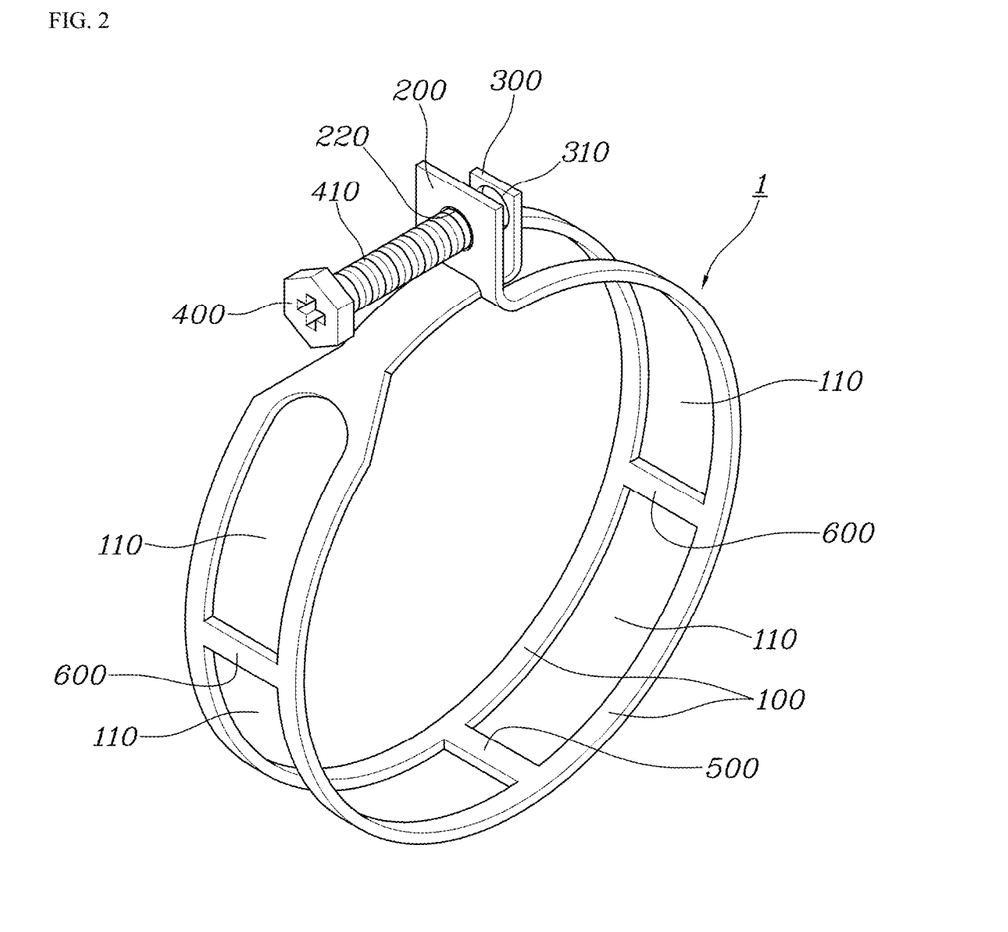
FIG. 2 is a perspective view showing the clamp according to an exemplary embodiment of the present disclosure.
Figure 3:
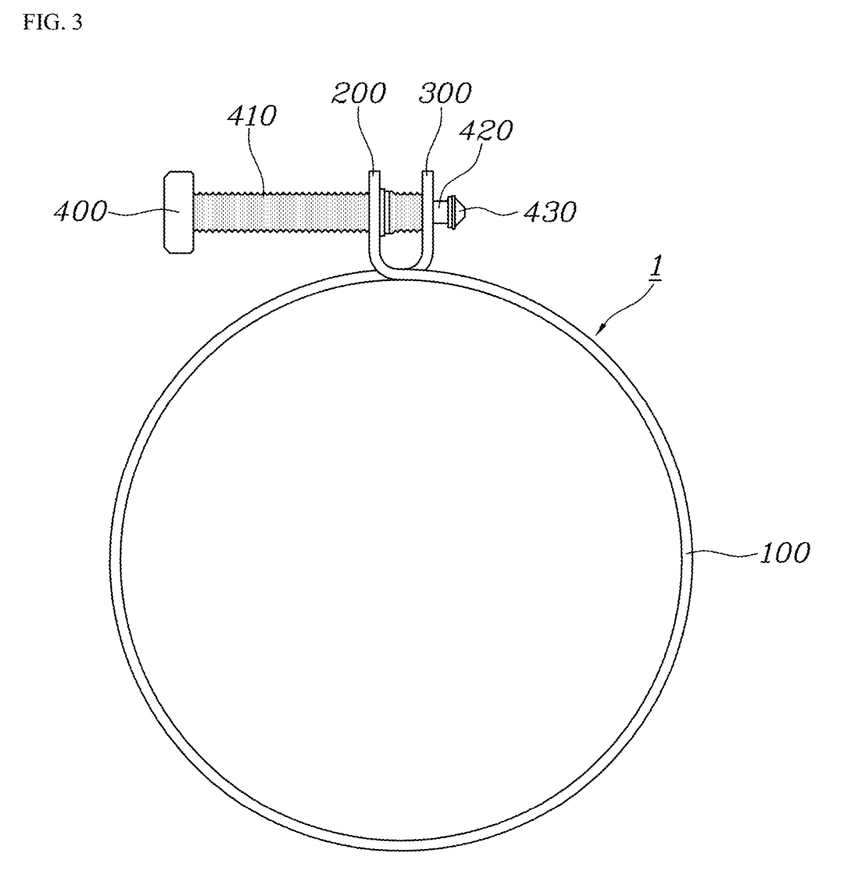
FIG. 3 is a right side view of FIG. 2.

On the other hand, the clamp 1 according to an exemplary embodiment of the present disclosure has a structure in which the nut portion 200 and the washer portion 300 that are fastened to each other with the bolt 400 are integrally formed at the opposite ends of the band portion 100. Therefore, reduction in the separate portions causes cost reduction, weight reduction and reduction in risk of loss.

According to an exemplary embodiment of the present disclosure, the clamp 1 has a perforated portion 110 which is extended in a longitudinal direction of the band portion 100 from a first end portion to a second end portion of the band portion 100 and is provided to penetrate through the band portion 100.

The perforated portion 110 is configured to reduce the weight of the band portion 100 to induce weight reduction and cost reduction.

The band portion without the perforated portion is a single wide plate, but the band portion 100 with the perforated portion 110 includes two narrow and long plates by the perforated portion 110.

The two narrow and long plates have a tightening force wrapping the circular member 3 stronger than the wide single plate, so that the band portion 100 with the perforated portion 110 may further strengthen the fastening force of the clamp 1.

According to an exemplary embodiment of the present disclosure, the clamp 1 includes a connection portion 500 which is located opposite to the bolt 400 and connects a first edge portion to a second edge portion of the band portion 100 across the perforated portion 110.

The connection portion 500 is located 180 degrees opposite to the bolt 400 and connects the one portion to the another portion of the band portion 100. When the bolt 400 is tightened to fix the clamp 1 to the circular member 3, the connection portion 500 strengthens a fixing force of the band portion 100 wrapping the circular member 3 to facilitate location fixation of the clamp 1. The connection portion 500 prevents the band portion 100 from slipping even when the bolt 400 rotates by use of a tool applying a force.

According to an exemplary embodiment of the present disclosure, the clamp 1 includes a plurality of support portions 600 located between the bolt 400 and the connection portion 500 and connecting the one portion to the another portion of the band portion 100 across the perforated portion 110.

The support portions 600 are located at locations spaced from the bolt 400 at clockwise 90 degrees and counterclockwise 90 degrees, respectively, and each connects the one portion to the another portion of the band portion 100. When the bolt 400 is tightened to fix the clamp 1 to the circular member 3, the support portions 600 are configured to prevent the band portion 100 from being deformed by the torque when the bolt 400 is tightened.

According to an exemplary embodiment of the present disclosure, the clamp 1 has the structure in which the connection portion 500 and the support portions 600 are integrally formed with the band portion 100. Therefore, reduction in the separate portions causes cost reduction, weight reduction, and reduction in risk of loss.

The conventional clamp includes portions, which correspond to the connection portion and the support portions, separately provided from the band portion and then assembled to each other. Therefore, many separate portions are provided in the clamp, so that the manufacturing cost is high, and there is a risk of loss of the separate portions.

According to an exemplary embodiment of the present disclosure, the clamp 1 has the washer portion 300 that passes through the perforated portion 110 in a direction from the inside space to the outside space of the band portion 100 to protrude in the same direction as the nut portion 200 to face the nut portion 200.

Figure 4:
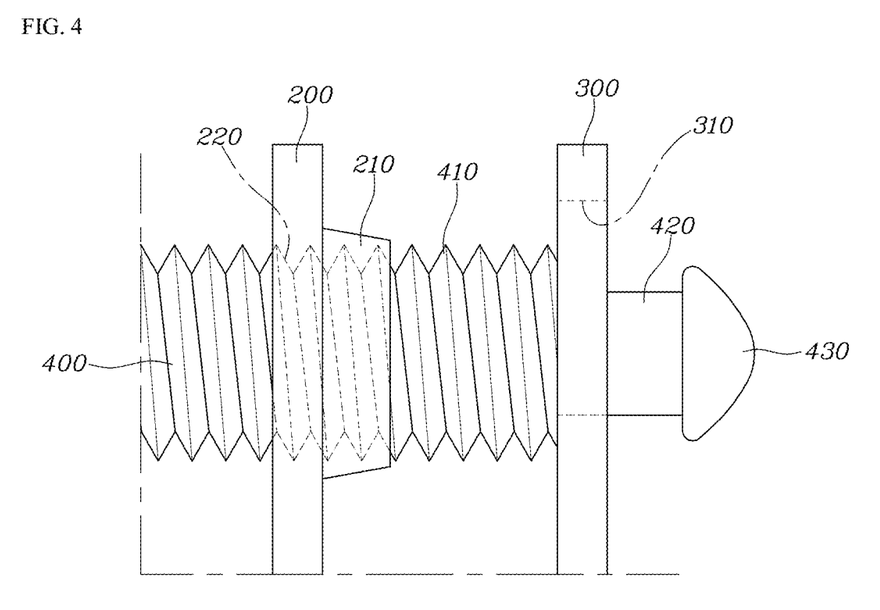
FIG. 4 is an enlarged view showing a portion to which a bolt is fastened in FIG. 3.

According to an exemplary embodiment of the present disclosure, a reinforcing portion 210 is formed to protrude from one surface of the nut portion 200 in a direction toward the washer portion 300, and a screw hole 220, which is fastened with the bolt 400, is formed to penetrate through the nut portion 200 and the reinforcing portion 210.

The reinforcing portion 210 is configured to reinforce the strength and the stiffness of the nut portion 200 to prevent the nut portion 200 from being deformed by the torque when the bolt 400 is tightened.

According to an exemplary embodiment of the present disclosure, an end portion of the bolt 400 has an extended portion 420 with a diameter smaller than a diameter of a thread 410 of the bolt 400, the washer portion 300 has a washer hole 310 through which the extended portion 420 passes, and an end of the extended portion 420 has a head portion 430 with a diameter greater than a diameter of the washer hole 310, so that the head portion 430 prevents the bolt 400 from being removed from the washer hole 310.

Figure 5:
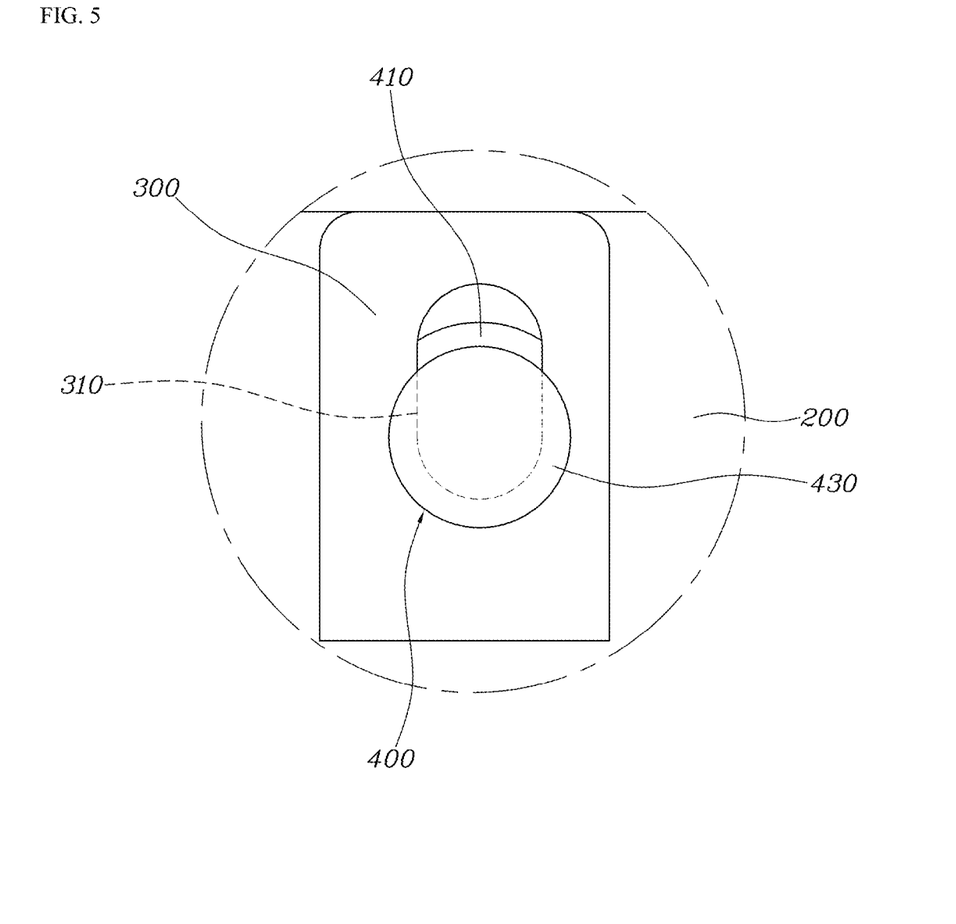
FIG. 5 is a right side view of FIG. 4.

The washer hole 310 formed in the washer portion 300 is formed into an oval extended in a longitudinal direction of the washer portion.

In other words, the washer hole 310 is formed into the oval extended in a perpendicular direction based on the state shown in FIG. 5.

When the bolt 400 rotates to tighten the clamp 1, i.e., when the bolt 400 rotates to reduce the diameter of the band portion 100, a distance between the nut portion 200 and the washer portion 300 increases while the nut portion 200 and the washer portion 300 move away from each other, and as the nut portion 200 and the washer portion 300 move away from each other, an angle between the nut portion 200 and the washer portion 300 is gradually changed so that the nut portion 200 and the washer portion 300 are not in parallel to each other.

When the washer hole 310 is formed in a regular circle not an oval, the band portion 100 is deformed into a crumpled circle due to the nut portion 200 and the washer portion 300 with the changed angle. In the instant case, the inside surface of the band portion 100 is prevented from being circumferentially in contact with the external surface of the circular member 3 in the circular shape and a gap is generated in several sections between the band portion and the circular member, and the clamp 1 may not function properly as a fastening force between the clamp and the circular member deteriorates due to the gap.

In the exemplary embodiment of the present disclosure, the washer hole 310 of the washer portion 300 is formed in the oval extended in the vertical direction. Therefore, when the bolt 400 is tightened, the nut portion 200 and the washer portion 300 receive a twisting force to deform the angle therebetween while moving away from each other, and the extended portion 420 of the bolt 400 moves along the oval washer hole 310.

Therefore, the nut portion 200 and the washer portion 300 are not changed in angle therebetween and maintain the parallel state as the extended portion 420 of the bolt 400 moves along the oval washer hole 310, and the band portion 100 maintains the regular circle due to the nut portion 200 and the washer portion 300 with unchanged angle. The internal surface of the band portion 100 is circumferentially in contact with the external surface of the circular member 3 in the circular shape, so that the function of the clamp 1 may be further strengthened.

Figure 6:
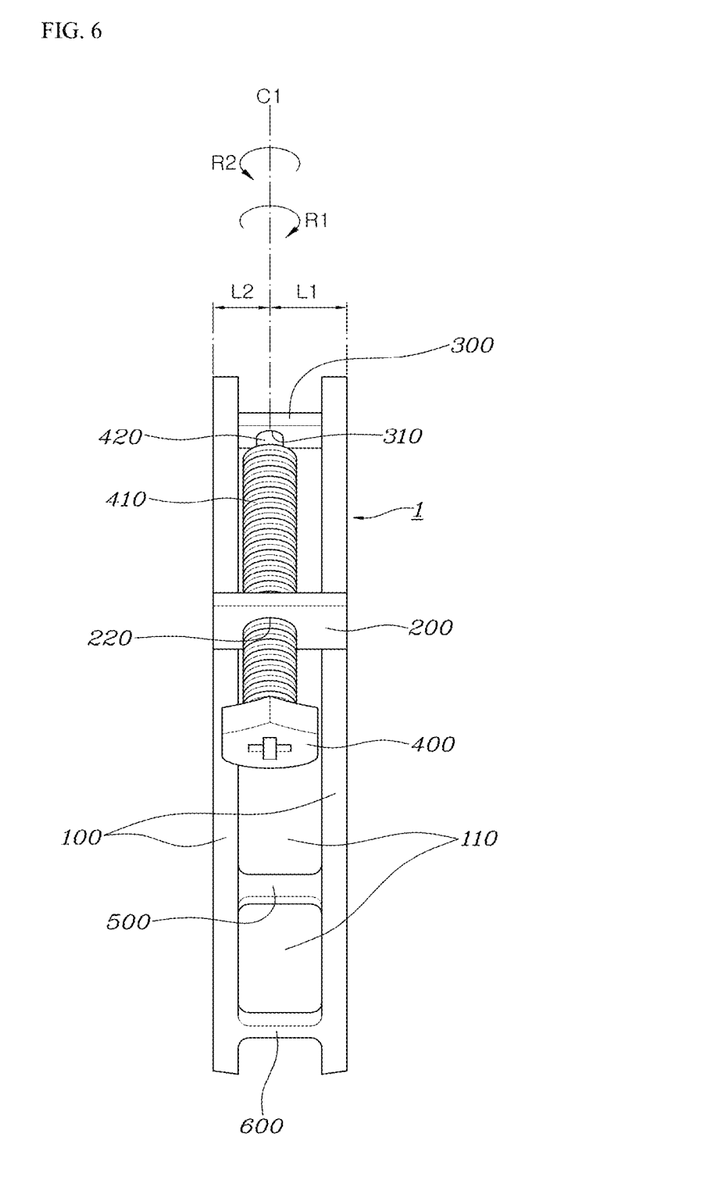
FIG. 6 is a plan view of FIG. 3.

Furthermore, as shown in FIG. 6, the clamp 1 according to an exemplary embodiment of the present disclosure is characterized in that when the bolt 400 passes through the screw hole 220 and the washer hole 310, a first distance L1 between a center portion C1 of the bolt 400 and a first portion of the band portion 100 and a second distance L2 between the center portion C1 and a second portion of the band portion 100 are difference to each other.

In other words, the first distance L1 is a distance from the center portion C1 of the bolt 400 in a rotation direction R1 when the bolt 400 is tightened, and the second distance L2 is a distance from the center portion C1 of the bolt 400 in a rotation direction R2 when the bolt 400 is released. The clamp is characterized in that the first distance L1 is formed longer than the second distance L2.

When the bolt 400 rotates using a tool to tighten the clamp 1, i.e., when the bolt 400 is tightened, an end portion of the band portion 100 receives a torque in the rotation direction R1 when the bolt 400 is tightened and thus receives a large load in a rightward direction based on the center portion C1 of the bolt 400 in the state shown in FIG. 6.

Therefore, according to the exemplary embodiment of the present disclosure, the center portion C1 of the bolt 400 is off-centered leftward to make the first distance L1 longer than the second distance L2, preventing the end portion of the band portion 100 from being bent by the torque when the bolt 400 is tightened. Therefore, the clamp 1 is prevented from twisting, and the function of the clamp 1 is more strengthened.

The end portion of the band portion 100 may be an end portion of the nut portion 200 or an end portion of the washer portion 300.

As described above, the clamp 1 according to an exemplary embodiment of the present disclosure has the structure formed of the circular band portion 100 wrapping the circular member 3, such as a hose, the washer portion 300, the nut portion 200, and the connection portion 500, and the support portions 600 that prevent the band portion 100 from being deformed when the bolt 400 is tightened that are integrated together into a single portion. Therefore, reduction in the separate portions causes cost reduction, weight reduction, and reduction in risk of loss of the separate portions, and When the tightening work is performed as the bolt 400 rotates using a tool, as deformation of the band portion 100 be suppressed as much as possible, and the enhancement in the fastening force and reuse of the clamp are possible.

Furthermore, the clamp 1 according to an exemplary embodiment of the present disclosure has the band portion 100 and the connection portion 500 that are integrated to each other, so that when the tightening work is performed as the bolt 400 rotates, a performance problem in that the clamp 1 rotates may be improved.

Furthermore, the clamp 1 according to an exemplary embodiment of the present disclosure is enhanced in the external appearance in comparison to a wire clamp, the external appearance of the engine compartment may be enhanced and the consumer satisfaction may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A clamp apparatus comprising:
   a band portion configured to wrap a circular member;
   a nut portion and a washer portion integrally formed on opposite ends of the band portion, respectively, and bent outward and facing each other; and
   a bolt passing through and being engaged to the nut portion and the washer portion and configured to reduce or increase a diameter of the band portion while rotating,
   wherein an end portion of the bolt includes an extended portion with a diameter smaller than a diameter of a thread of the bolt,
   wherein the washer portion has a washer hole through which the extended portion passes,
   wherein an end of the extended portion has a head portion with a diameter greater than a diameter of the washer hole to prevent the bolt from being removed from the washer hole, and
   wherein the washer hole is formed in an oval extended in a longitudinal direction of the washer portion.

2. The clamp apparatus of claim 1, wherein a perforated portion is formed to extend in a longitudinal direction of the band portion from a first end portion to a second end portion of the band portion and to penetrate through the band portion.

3. The clamp apparatus of claim 2, further including:
a connection portion located at a location of the band portion opposite to the bolt and connecting a first edge portion to a second edge portion of the band portion across the perforated portion,
wherein when the bolt is rotated, the connection portion increases holding power of the band portion wrapping the circular member to prevent the band portion from slipping on the circular member.

4. The clamp apparatus of claim 3, further including:
a plurality of support portions located between the bolt and the connection portion and connecting the first edge portion to the second edge portion of the band portion across the perforated portion,
wherein the plurality of support portions prevent the band portion from being deformed due to a torque when the bolt is rotated.

5. The clamp apparatus of claim 2, wherein the washer portion passes through the perforated portion in a direction from an inside space of the band portion to an outside space of the band portion to face the nut portion.

6. The clamp apparatus of claim 1, further includes:
a reinforcing portion formed to protrude from a surface of the nut portion in a direction toward the washer portion; and
a screw hole formed to penetrate through the nut portion and the reinforcing portion, wherein the screw hole is fastened with the thread of the bolt.

7. The clamp apparatus of claim 6, wherein when the bolt is tightened and the nut portion and the washer portion move away from each other so that a distance therebetween increases, the extended portion of the bolt moves along the oval washer hole, and thus an internal portion of the band portion is configured to circumferentially contact with an external portion of the circular member, fastening the band portion and the circular member with each other.

8. The clamp apparatus of claim 6, wherein when the bolt is mounted to pass through the screw hole and the washer hole, a first distance between a center portion of the bolt and a first edge portion of the band portion and a second distance between the center portion of the bolt and a second edge portion of the band portion are different from each other.

9. The clamp apparatus of claim 8,
wherein the first distance is a distance from the center portion of the bolt in a rotation direction when the bolt is tightened, and the second distance is a distance from the center portion of the bolt in a rotation direction when the bolt is released.

10. The clamp apparatus of claim 9,
wherein the first distance is formed greater than the second distance so that an end of the band portion is prevented from being bent by a torque when the bolt is tightened.

* * * * *